Aug. 8, 1933.  E. CRAIN  1,921,809
GAS PIPE STOP
Filed Nov. 6, 1931
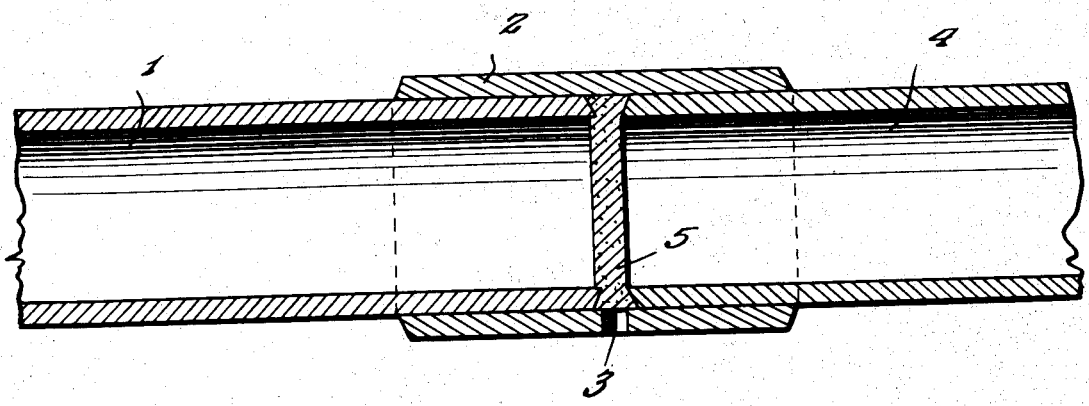
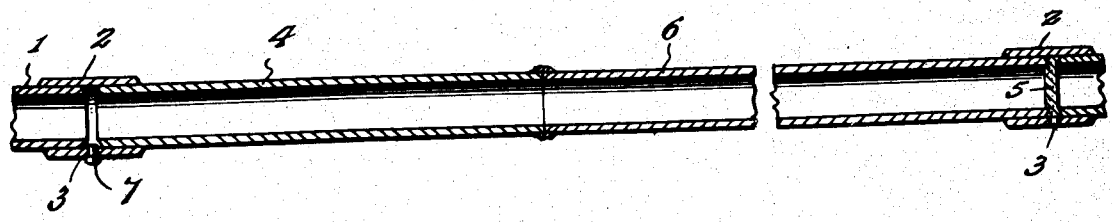
Inventor
Earl Crain.
By Lacey & Lacey,
Attorneys Patented Aug. 8, 1933

1,921,809

UNITED STATES PATENT OFFICE 1,921,809

GAS PIPE STOP

Earl Crain, West Frankfort, Ill.

Application November 6, 1931. Serial No. 573,447

4 Claims. (Cl. 285—193)

The object of this invention is to provide a stop or closure for the end of a gas line which will permit an extension to be readily connected to an existing line without stopping the flow of gas to consumers and the work of connecting an extension may be performed expeditiously with entire safety to the workmen. One embodiment of the invention is illustrated in the accompanying drawing and the invention resides in certain feautres which will be hereinafter first fully described and then more specifically defined in the appended claims.

Figure 1 of the annexed drawing is a longitudinal section of the device of my invention, Fig. 2 is a similar view on a reduced scale showing the application of the device to a gas line.

The stop consists of two alined pipe sections 1 and 4 about the meeting ends of which is firmly secured, by welding or otherwise, a collar or sleeve 2 having a radial opening 3 at one point which opening is always disposed at the bottom of the device when it is applied to a gas line. A fusible disk 5 is disposed within the coupling sleeve 2 between the ends of the pipe sections and is held in place by said sections and the sleeve so that the bore of the device is completely closed to the flow of fluid. It will be noticed that the opening 3 leads directly to the edge of the fusible plug which may be of any soft metal or other material which is easily melted.

When the original gas line is finished, the free end of the pipe section 1 is welded to the end of the line and the gas admitted to the line will then be stopped by the plug 5. When an extension is to be run, the end of the pipe 6, constituting the first length of the extension, is welded to the projecting end of the pipe section 4, as will be understood on reference to Fig. 2. After the extension of the line has been finished, a second stop is connected to the end of the extension so that when gas is admitted to the extension, the flow will be arrested at the end thereof. To admit gas to the extension, a blow pipe or torch is brought into position midway the ends of the first placed coupling sleeve and permitted to play thereon until the plug is partly melted whereupon the gas will flow into the extension, the flow being sufficiently audible to be heard by the workman. When the pressure upon the two sides of the plug is equalized, the workman will be notified by the cessation of the noise caused by the flow and the torch is then again applied until the entire fusible plug is melted, the molten metal escaping through the opening 3. There may, at times, be some ignition of gas tending to escape through the opening 3 from the space occupied originally by the plug. This ignition will be due to the heat stored in the pipe from the blow torch but it will be quickly extinguished as the pipe cools and will not be a serious matter at any time. As the collar or sleeve and the pipes are subjected to the heat from the blow torch, they will expand somewhat and this expansion will tend to bring the ends of the pipe sections closer together so as to make a tight joint. After the melted fuse has been entirely dicharged from the gas line, the opening 3 is closed by a plug 7 and the plug welded, cemented or otherwise firmly secured in place so as to make a leak-proof joint. The gas line will then be in service. When the gas line is to be extended a second time, the described operation is repeated at the second gas stop.

My invention is exceedingly simple and will effectually prevent escape of gas at the end of a line and will permit an extension to be coupled to the line without necessitating any stoppage of the flow of gas to consumers. The fuse may be melted without endangering the workmen at all inasmuch as the opening through the coupling sleeve or collar may be very small and the possible leakage of gas through said opening will be generally inconsequential. If, however, the workmen are timid, gas masks may be provided.

Having thus described the invention, I claim,

1. The method herein described of connecting an extension to a gas line which consists in securing to the end of the line a tubular body containing a fusible plug to close the end of the gas line, securing the end of an extension to the projecting end of the tubular body, and then applying heat to the tubular body to entirely melt the plug and establish flow from the gas line to the extension.

2. The method of connecting an extension to a gas line which consists in securing to the end of a gas line one end of a sleeve containing a fusible plug to close the gas line, the sleeve having a radial opening, securing an extension to the free end of the sleeve, applying heat to the exterior of the sleeve whereby to melt the plug and establish flow from the gas line through the extension, and then closing the radial opening.

3. The combination with a gas conductor, of a pipe section including a coupling sleeve secured about the end of said conductor and provided with a radial opening, and a fusible plug disposed within the sleeve and fitting against and entirely covering the end of the pipe section, said plug extending over the radial opening in the coupling sleeve and when melted adapted to be discharged through said opening.

4. The method of connecting an extension to a gas line which consists in securing to the end of a gas line one end of a sleeve containing a fusible plug to close said gas line, the sleeve having a radial opening therein, securing the extension to the free end of the sleeve, applying heat to the exterior of the sleeve to partially melt the plug and establish flow from the gas line through the extension, again applying heat to the exterior of the sleeve to further melt the plug and permit the fused material to flow out through the radial opening, and subsequently closing said opening.

EARL CRAIN. [L.S.]